US006986146B2

(12) United States Patent
Brocco et al.

(10) Patent No.: US 6,986,146 B2
(45) Date of Patent: Jan. 10, 2006

(54) METHOD AND APPARATUS FOR PROVIDING A STATE MACHINE OPERATING ON A REAL-TIME OPERATING SYSTEM

(75) Inventors: Matt Brocco, Debary, FL (US); Dennis Cutillo, Sanford, FL (US); Mike Shaffer, Lake Mary, FL (US)

(73) Assignee: Siemens Communications, Inc., Boca Raton, FL (US)

( * ) Notice: Subject to any disclaimer, the term of this patent is extended or adjusted under 35 U.S.C. 154(b) by 679 days.

(21) Appl. No.: 10/159,209

(22) Filed: May 30, 2002

(65) Prior Publication Data

US 2003/0005175 A1   Jan. 2, 2003

Related U.S. Application Data

(60) Provisional application No. 60/294,201, filed on May 30, 2001.

(51) Int. Cl.
*G06F 9/54*   (2006.01)
(52) U.S. Cl. .......................... 719/318; 719/313; 700/1
(58) Field of Classification Search ............. 700/1–27; 719/318, 310–317, 319, 320
See application file for complete search history.

(56) References Cited

U.S. PATENT DOCUMENTS

| | | | | |
|---|---|---|---|---|
| 4,740,891 A | * | 4/1988 | Kirkpatrick | 713/500 |
| 5,463,543 A | * | 10/1995 | Wagner | 700/12 |
| 5,694,327 A | * | 12/1997 | Schurig et al. | 716/1 |
| 5,909,369 A | * | 6/1999 | Gopinath et al. | 700/3 |
| 6,061,603 A | * | 5/2000 | Papadopoulos et al. | 700/83 |
| 6,097,988 A | * | 8/2000 | Tobias | 700/23 |
| 6,138,171 A | * | 10/2000 | Walker | 719/318 |
| 6,317,638 B1 | * | 11/2001 | Schreder et al. | 700/79 |
| 6,327,508 B1 | * | 12/2001 | Mergard | 700/5 |
| 6,374,144 B1 | * | 4/2002 | Viviani et al. | 700/12 |
| 6,799,319 B2 | * | 9/2004 | Van Loo | 719/328 |
| 2001/0003804 A1 | * | 6/2001 | Papadopoulos et al. | 700/83 |
| 2002/0144015 A1 | * | 10/2002 | Lortz | 709/318 |

* cited by examiner

*Primary Examiner*—St. John Courtenay, III (57) ABSTRACT

A software state event machine for software based process control systems permits state and events to be unified within a common set of data structures for one or more tasks sharing common state numbers. This method reduces overall memory requirements in systems with extensive states and events among multiple tasks.

13 Claims, 7 Drawing Sheets

METHOD AND APPARATUS FOR PROVIDING A STATE MACHINE OPERATING ON A REAL-TIME OPERATING SYSTEM

CROSS REFERENCE TO RELATED APPLICATIONS

This application claims the benefit of priority under 35 U.S.C. 119(e) to U.S. Patent Provisional Applications, Ser. No. 60/294,201 and filed on May 30, 2001, the contents of said application being incorporated by reference herein in its entirely.

This application is also related to the following U.S. Patent Applications: U.S. patent application Ser. No. 10/159,210 filed May 30, 2002 entitled AN INTEGRATED ACCESS PLATFORM; U.S. patent application Ser. No. 10/159,205 filed May 30, 2002 entitled METHOD FOR OPERATING AND APPARATUS FOR A BACK-PLANE SUPPORTING REDUNDANT CIRCUIT CARDS; U.S. patent application Ser. No. 10/159,207 filed May 30, 2002 entitled METHOD AND APPARATUS OF TESTING A POTS CIRCUIT AND DSL CIRCUIT THROUGH A SPLITTER; U.S. patent application Ser. No. 10/157,426 filed May 30, 2002 entitled METHOD AND APPARATUS FOR LOADING A MIRROR IMAGE SOFTWARE COPY ACROSS CIRCUIT CARDS; U.S. patent application Ser. No. 10/159,204 filed May 30, 2002 entitled METHOD AND APPARATUS FOR A COMMON MANAGEMENT SOFTWARE SYSTEM; U.S. patent application Ser. No. 10/159,208 filed May 30, 2002 entitled METHOD AND APPARATUS FOR PROVIDING A COMMON TEXT MESSAGING SYSTEM WITHIN A SOFTWARE ARCHITECTURE; and U.S. patent application Ser. No. 10/159,206 filed May 30, 2002 entitled METHOD AND APPARATUS FOR ADMINISTERING MULTIPLE PROVISIONABLE OBJECTS, the contents of each of said applications being incorporated by reference herein in their entirely.

BACKGROUND OF THE INVENTION

1. Field of the Invention

The present invention generally relates to real-time software state machine system and method within a communications system. More specifically, state machine processing is integrated with a Real-time Operating System (RTOS) execution environment.

2. Background Description

Various types of process control systems employing microprocessors and software to manage the functions of real time activities have been common in many industries. Whether the system is a complex air-traffic control system, manufacturing process control system, a reservation system, or a communication system, the on-going management of the system is crucial to long-term success.

The nature of process control systems such as in communication packet or circuit switches involve the control of substantial hardware interfaces. These interfaces provide basic and advanced capabilities towards creating a comprehensive communications network for reliably transporting various types of data such as video media, voice traffic, or transactional data.

The communications industry provides features and functionality that combine essential reliable basic services along with specialized services and capabilities that are delivered through new technologies at varying stages of deployment and maturity. As communications systems are deployed, they often contain both traditional hardware interfaces along with new technology hardware interfaces that provides a basis for increased functionality or evolutionary incremental infrastructure that is meant to deliver more robust communications based on this expanded functionality or based on economic changes in technology.

Software programming that provides control logic to these communication systems is subject to increasing complexity. This complexity is driven by the newer technologies themselves such as voice over packet switching, new distributed hardware topologies, higher demanded bandwidths, or by reliability and management requirements such as better human interfaces, maintenance and diagnostic capabilities, or operational ease of management.

In communication systems for example, one necessary aspect of the operational management of the system is a capability to view the ongoing internal operations of the system. In a complex system, the internal operations of the system can contain large numbers of independent functional software tasks which process messages and events in connection with the operation of the system hardware interfaces.

These software tasks were managed in turn by a Real-time Operating System (RTOS). As inter-task messages were created and sent to other tasks, reference to a logical or physical device such as a port was contained in the message. Also contained in the inter-task messaged typically was a new event, such as a timer time-out or a hardware detected input such as an off-hook of a phone.

Typically, in the past, every task running under a RTOS had a set of state tables created to service the events based on the event received. The task would be self-contained with all awareness of the state-event data structure linkages for all functions managed and process by that task. The software system would contain many tasks each with their own collection of state-event tables. Under this typical scenario the RTOS was isolated from the task processing and the tasks were isolated from the RTOS. Under this arrangement, the structure of the task's state machine was unknown to the support functions within the RTOS. This resulted in difficulties in maintaining these state machines and inefficiencies were created since the tasks could not take advantage of pre-existing functions already available within the RTOS.

SUMMARY OF THE INVENTION

It is therefore an object of the invention to provide a method and apparatus for state event handling to occur using a data structure that combines state, event, message ID, and state transition routine address.

It is another object of the invention to provide a method to reduce the amount of memory required to support state event handling mechanisms in large process control systems.

It is another objective of the invention to permit a real time operating system to directly execute state transition routines.

It is another objective of the invention to permit reuse of state numbers among several subsystems.

According to the invention there is a software state event machine for software based process control systems that permits state and events to be unified within a common set of data structures for one or more tasks sharing common state numbers. This method reduces overall memory requirements in systems with extensive states and events among multiple tasks. This is a method of processing a software state machine of a communication system such as the Siemens Accession product.

A collection of functions known as VxGex (Gex) implements a state machine RTOS for use, for example, with Vx Works® (Vx Works® is a registered trademark of Wind River Systems) or similar operating systems (OS). VxGex integrates state machine processing with the RTOS execution environment.

An operating system is able to have multiple state machines associated with it. Each state machine under an operating system task has a data structure, called an Event Control Block (ECB). The ECB is used to store data that must be preserved across state transitions. The data in the ECB includes the current state of the state machine and the ECB type.

The ECB type is distinguished between different types of state machines. For example, a plain old telephone (POTS) port state machine can have loop start and ground start ports. The ECB allows state machines under the same task to behave differently. The events are received from a standard OS message queue. The message header contains the event being received, the Message ID, and optionally, the ECB number that the event is intended.

The Message ID is a way to categorize the messages by function, for example, Call Processing, Administration, Status, etc. This allows event codes to be reused over message ID. If there is no ECB number specified in the message, a user defined preprocessor is invoked to determine the ECB number.

The OS will schedule state transition routines based on the event received and the current state of the machine. The proper state transition routine to schedule is based on a state event table. The first section of the state event table is an array of pointers to type event tables. The state event table is indexed by a state. If the pointer is NULL, an error routine is called and the next message is received. If the pointer is not NULL, the type event table is sequentially searched for a match on ECB type, message ID and event. If a match is found an error routine is called and the next message received.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A DETAILED EMBODIMENT OF THE INVENTION

Figure 1:
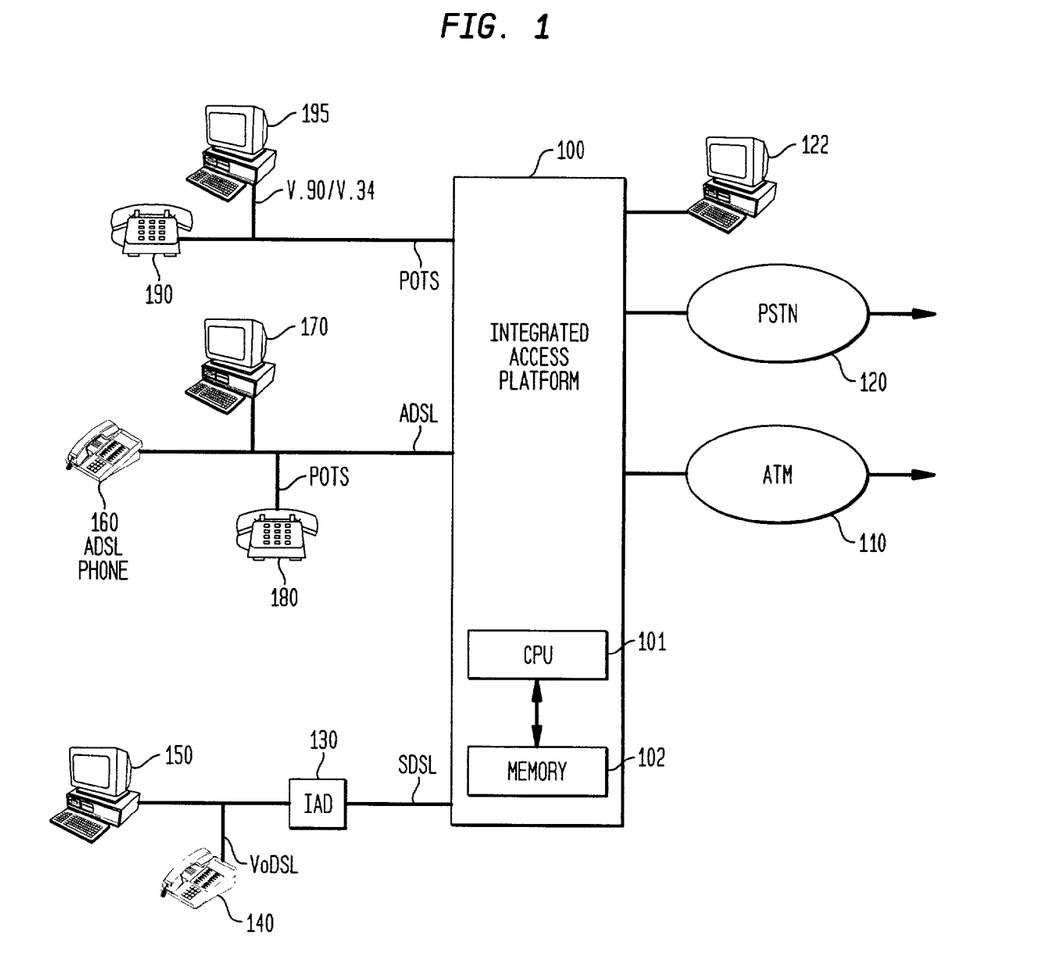
FIG. 1 is an exemplary block diagram of a communication system utilizing the present invention.

Referring to FIG. 1, an exemplary communication system is shown as an Integrated Access Platform (IAP) 100, which is a system to provide data and voice communications functionality. The IAP may be a modular system with various interface modules present to build a tailored system as required by a customer. The IAP provides the hardware and software functionality for subscribers to process and manage a wide range of communication features. The IAP contains a central processing unit (CPU) 101 and associated memory 102, for implementing software programming and operating system.

The IAP is connected, in this example, to an Asynchronous Transfer Mode (ATM) network and also to a Public Switch Telephone Network 120. The IAP also provides interfaces of various kinds to subscribers and customers. Three examples of these interface types are illustrated.

At the bottom left, an IAP Symmetrical Digital Subscriber Line (SDSL) interface is connected to an Integrated Access Device (IAD) 130, which in turn supports a voice-over-digital subscriber line (VoDSL) phone 140 and a data terminal 150.

At the middle left, a asymmetric digital subscriber line (ADSL) interface connects a ADSL phone 160, a data terminal 170, and a plain old telephone service phone (POTS) 180 to the IAP.

At the top left, a POTS line connects a POTS phone 190 and a V.90/V.34 data terminal 195 to the IAP.

In a computer based process controlled system such as in a communication system, the ability to oversee and manage the operations of the system is essential. The User Interface to the system can be any of a number of device types such as a display, personal computer, or audio device. The User Interface 122 is where a user can oversee the operations of the system and is where text is provided as messages in a session with the system.

The hardware components of a system can be of varying purposes and each component can in turn be controlled by its own computer processor complex, which may be in communication with other processor complexes throughout the system.

In a communications system or other process control systems, many functions of the system are performed by the hardware interfaces such as telephone interfaces, power interfaces, data and voice signaling interfaces, data and voice transport interfaces such as asynchronous transport mode (ATM), and support interfaces such as alarms and diagnostics. These interfaces have their own specific function in relation to the system as a whole. These interfaces are typically under control of software logic control running on one or more microprocessors. The system may contain redundant processor capability with one complex in standby mode. The processors include memory.

In a communications system the operating software is typically comprises a plurality of individual tasks. These tasks may run under the same or multiple processors. Each task is given time slices of the overall processor execution capacity typically under control of the operating system (OS) software. Each task is meant to contribute a particular control aspect on behalf of the system such as, for example, a user feature or a hardware diagnostic function. In order for the software system to operate in a collaborative fashion, these tasks are capable of creating inter-task messages to cause advancement of process control sequences. In the case of a communication system, the process control sequence, for example, could be the establishment of a call session between subscribers or recognize a request for call completion from the PSTN or ATM network.

In the course of typical operation, the hardware interfaces create inputs to the software. The software generates event messages to represent the inputs of the hardware and thereafter controls the sequences of operations by passing inter-task messages to various system tasks responsible for progressing action of a specific type of message. Likewise, a software task may cause a message to be created in response to a prior event that eventually causes a hardware component to provide a service such as, for example, tone generation in a voice path.

Figure 2:
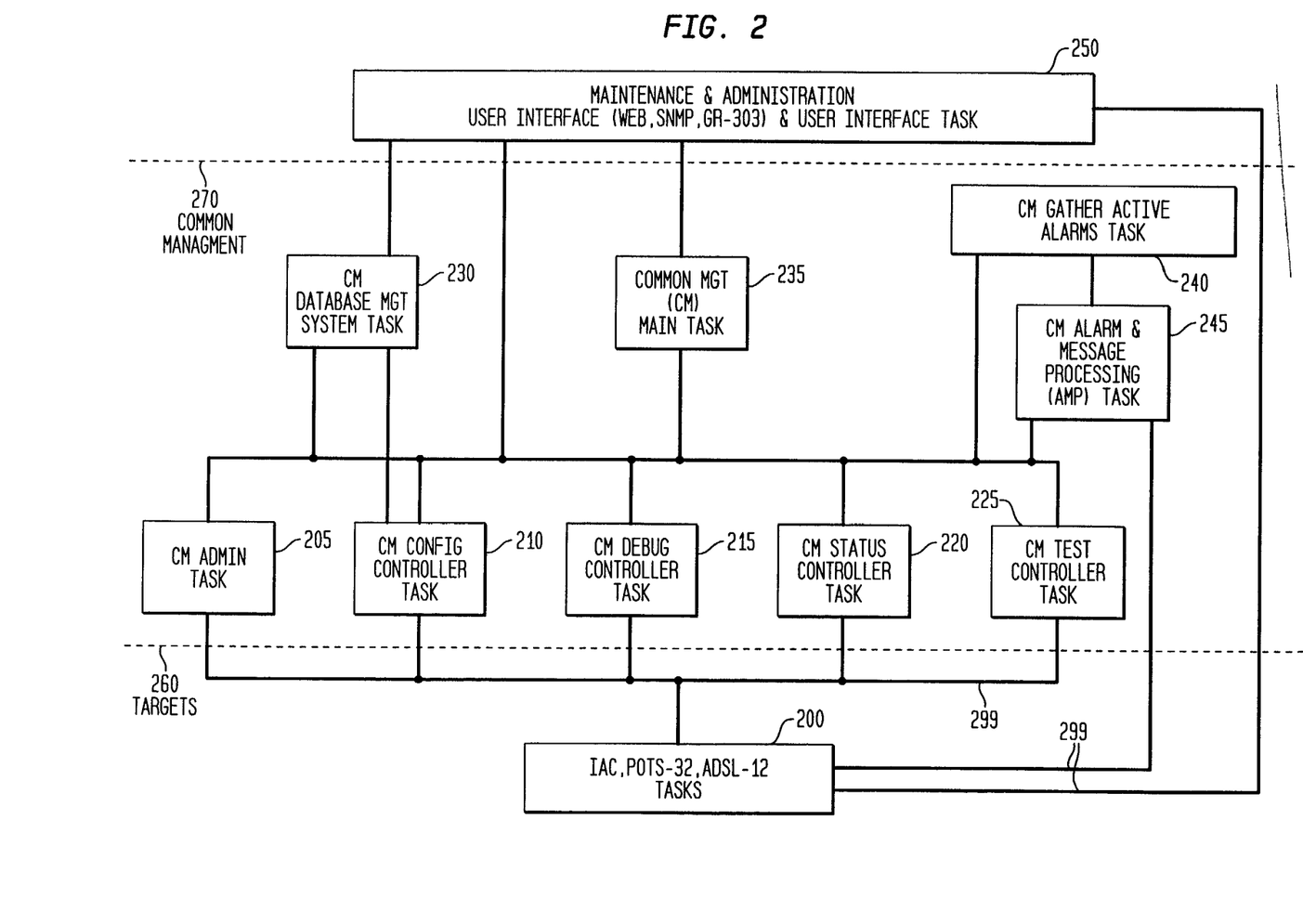
FIG. 2 is an exemplary block diagram of a software architecture contain illustrative tasks utilizing inter-task messaging within the system of FIG. 1.

Referring now to FIG. 2, exemplary software sub-system architecture suitable for a communication system is illustrated. This sub-system is one of several software sub-systems that may exist within a larger operating system (OS) context. This sub-system represents the Maintenance and Administration (M&A) sub-system of an IAP communication system. It provides the necessary controls and feedback to oversee and manage the overall operation of the system by people responsible for the ongoing performance of the system. It includes a User Interface Task, which controls the User Interface hardware. This sub-system is the primary access for viewing the status and activity of the hardware components of the system and for configuring the system for optimum compliance to the desires of an operating company or other entity using an IAP. This sub-system typically shares one or more common processors and is given access to the processor by an operating system.

FIG. 2 is organized to show three distinct levels of functional control. At the bottom, delineated by dash line 260, are software target tasks 200, responsible for directly controlling and monitoring specific hardware interfaces such as POTS, ADSL, and Integrated Access Controller (IAC). These tasks are capable of generating and receiving inter-task messaging represented by the solid lines 299, which are bi-directional paths.

The Common Management (CM) layer, delineated between lines 260 and 270, include software tasks of a comprehensive maintenance and administration which control and interact with the target tasks, 200, and the M&A User Interface, 250, and with one another. The Common Management task, 235, receives and sends messages to other sub-systems (not shown) within the IAP and distributes messages to proper CM layer tasks as necessary. Shown also in FIG. 2 are exemplary tasks CM Admin 205, CM Config Controller 210, CM Debug 215, CM Status Controller 220, CM Test Controller 225, CM Database Management System 230, CM Alarm & Message processing 245, and CM Gather Active Alarms 240.

CM Admin 205 provides process control to administer system features as required by the system manager personnel through the M&A User interface 250. CM Config 210 provides system hardware configuration control as requested by the M & A User Interface. CM Debug Controller 215 provides in-depth monitoring and feedback of detailed system information of system performance as requested by system managers. The CM Status Controller 220 provides general status information of hardware and software elements and components via the M&A User Interface. CM Test Controller 225 provides mechanisms to check and verify operational health of system components via the M&A User Interface. CM Active Alarms 240 and CM Alarm Message Processing 245 provide error and alarm detection and reporting control. CM Database Management system task 230 controls access to and from the System Database in order to synchronize, isolate, and protect the system data.

Figure 3:
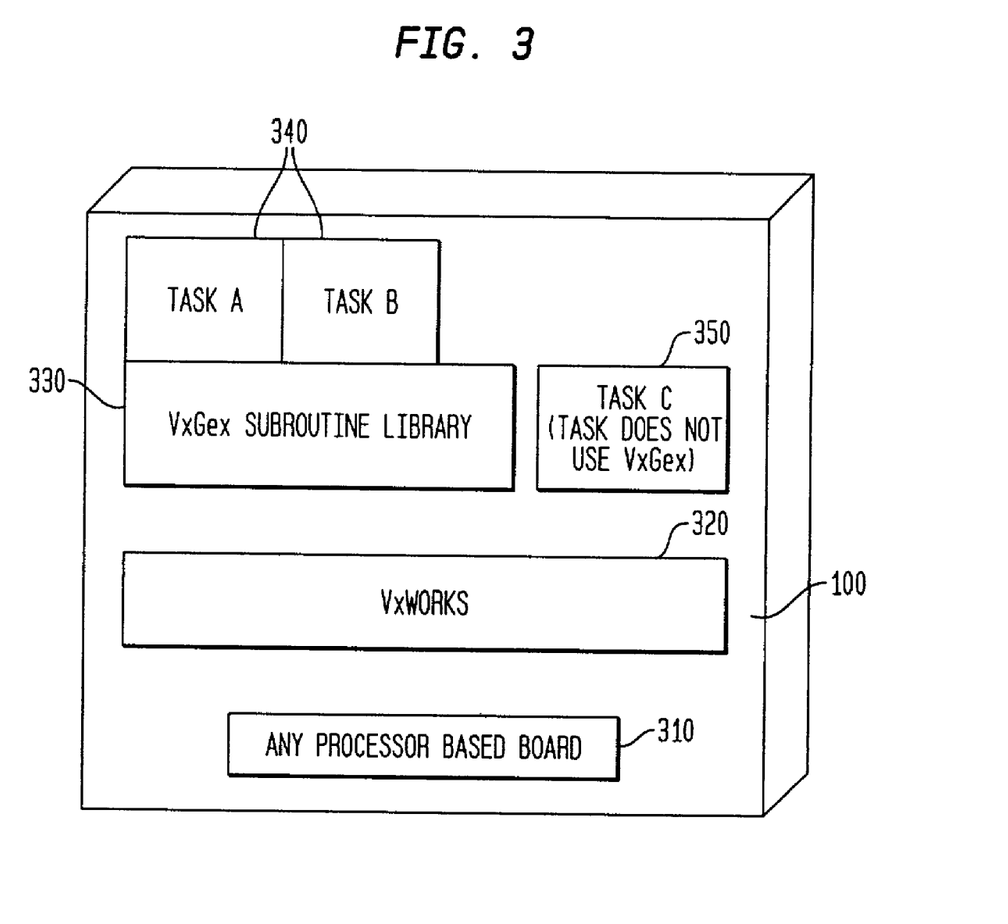
FIG. 3 is a block diagram showing the relationship of components of the present invention.

Referring to FIG. 3, this is another a block diagram showing element relationships of the present invention. The IAP 100 is shown and illustrates a communications system that contains a software environment. The RTOS, is shown as 320 and is shown running on a processor based board 310.

Shown also is the VxGex subroutine library 330, which is a collection of functions that implement a state machine on a RTOS platform. Task A and Task B 340 are generalized tasks representative of tasks in a communication system such as Administration, Call Processing, and tasks of FIG. 2.

Figure 4:
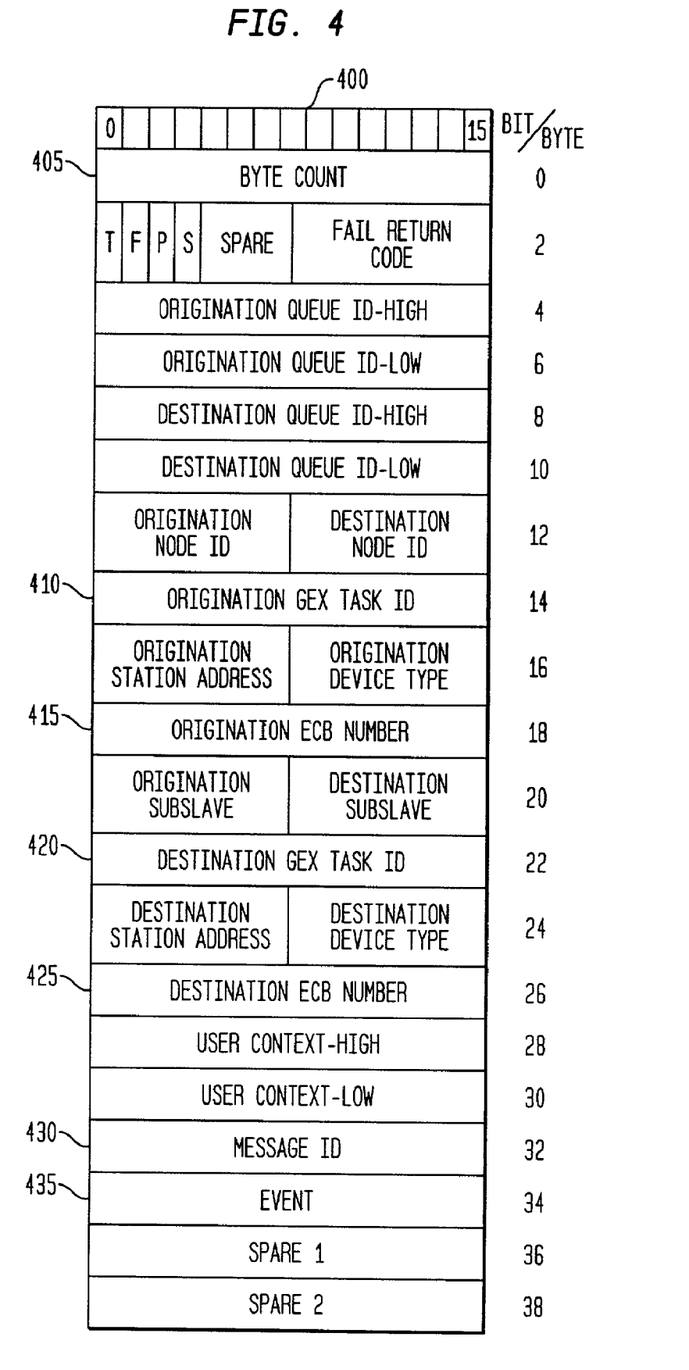
FIG. 4 is a memory layout table of a TSF Message used in inter-task messaging.

Each of these tasks communicates with each other with an inter-task message as shown in FIG. 4. An IAP Transport Function Service (TFS) Message Header structure 400 shows exemplary contents of an inter-task message. Other configurations and contents are possible. An inter-task message may include various informational and data elements as necessary to the nature of the message. Some of the fields shown in FIG. 4 include message byte count 405 which designates the total size of the TFS message and the originating Gex task ID 410 is the task sending the message. The origination event control block number (ECB) number 415 is shown as byte offset 18. ECBs are data structures to store data across state transitions for every logical and physical port or device within the system. The originating ECB is the port sending the message.

Also shown in FIG. 4 is the destination ECB 425, or the port to which the message is being sent. Message ID number 430 is a high level designation associated with subsystem, e.g., Call Processing or Administration, etc. that this message is associated. This higher level designation permits the numbering of the next field, Event 435 to be reused as required within different state machines associated with different subsystems.

Figure 5:
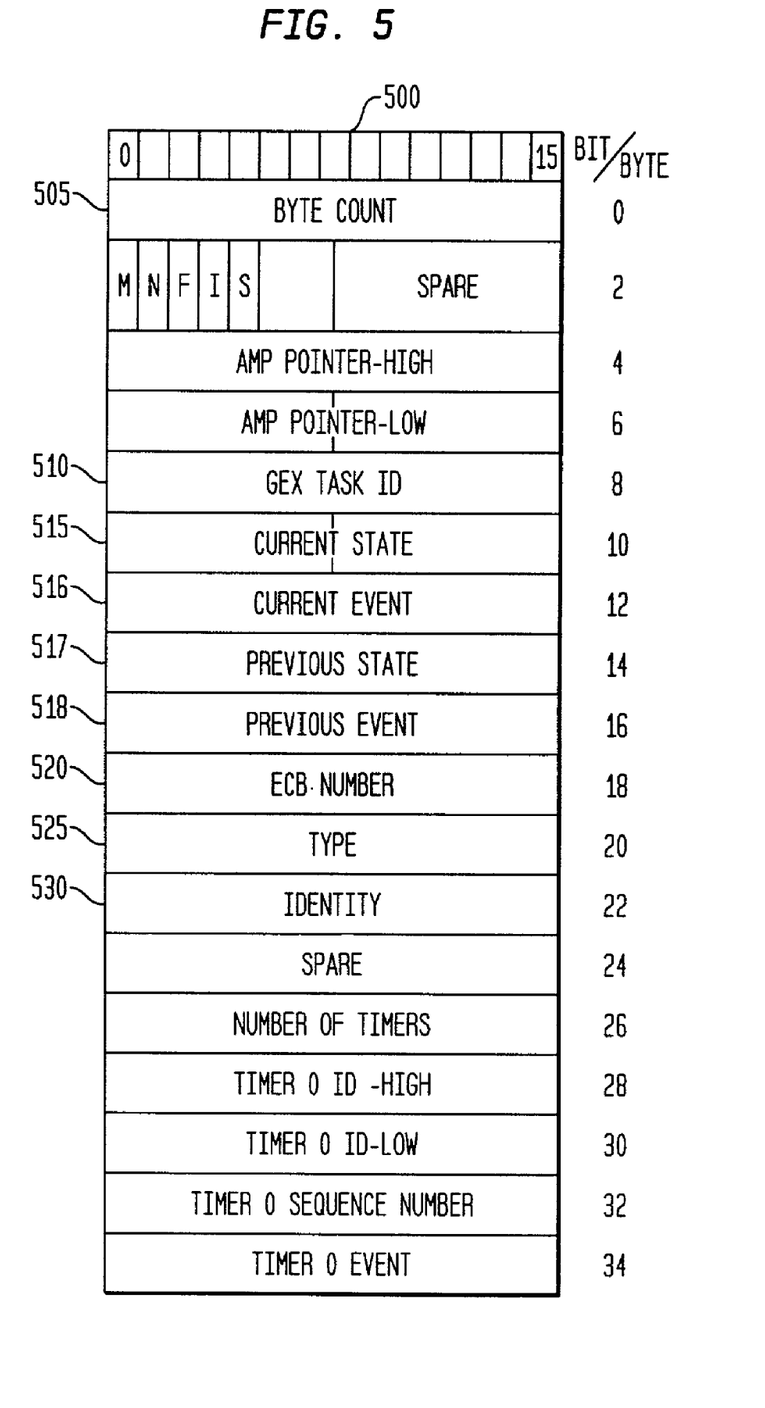
FIG. 5 is a memory layout table of an Event Control Block.

Referring to FIG. 5, an exemplary IAP ECB header 500 is shown. This is a data structure that contains a device or port specific transitory information. An ECB is defined for every port or device in the system. Different layouts and contents may exist for device specific data structures. The layouts and contents are typically related to the nature of the port or device. This is the data structure referenced in FIG. 4, fields 415 and 425. ECBs are defined in task specific data modules. This separates different task's ECBs into non-contiguous data space to help guard against ECB overwrites resulting from bad indexes into an ECB. ECBs, however, are globally accessible to allow for inter-task ECB access (state bashing).

The ECB includes a byte count 505, a Gex task ID 510, which is the task identifier that processes this type of ECB. The current state 515, of the device is shown as is the current event 516, which is to be processed. This field 516, is copied from the TFS field 435 when the TFS message is de-queued and processed by the RTOS. The device previous state, 517, and previous event, 518, is also maintained in the ECB for historical logic validation and sequencing in cases when the previous state or event is a necessary qualifier to decisions. Field 520 is the ECB number of this particular data structure so that it can be easily identified in circumstances such as memory dumps, sanity checks, or housekeeping routines.

The ECB type 525, is the device or port type which the ECB represents such as phone, loop start trunk, etc. The Identity field 530, is the Message ID type, which is the subsystem that this ECB is associated and is the same as field 430, of the TFS.

The following illustrative pseudo-code in Table A shows how the data structure for a state machine is organized and defined. The pseudo-code can be implemented in a variety of programming languages such as C or C++. The exemplary task is OCCUPANCY_TSK, which could be a task that monitors the processor duty burden or occupancy statistics. This task is representative of any number of tasks that could be managed under this present invention. Two states are shown UNEQ_S and ACTIVE_S for the OCCUPANCY_TSK, which could have any number of actual states.

There are four fields in the data structure. Type defines the type of task, i.e., Occupancy Task for each entry. The field Event defines possible events that could be received by this state. Message ID is the task that is permitted to use this state event table and is cross-checked during event processing to insure that the task is a valid task for receiving and processing the event. Transition routine field is the state/event processing routine destination that is designated to advance process control for the event in this state. Note that some events are ignored (ignore_event). Note that a DBG_OCC_E event is valid only for a Message ID (task) of DBG_RQ_M (these represent a debug event and task) otherwise the event is not processed. The Message_ID of ANY_ID is a type of wild card that means that the event is valid for any Message ID. So as can be seen, the task Message ID is embedded in the state definitions. In the past, a data structure would have two dimensions of state and event for a given single task (i.e., Message ID) so the system's overall state machine would necessarily be expanded in size.

Figure 7:
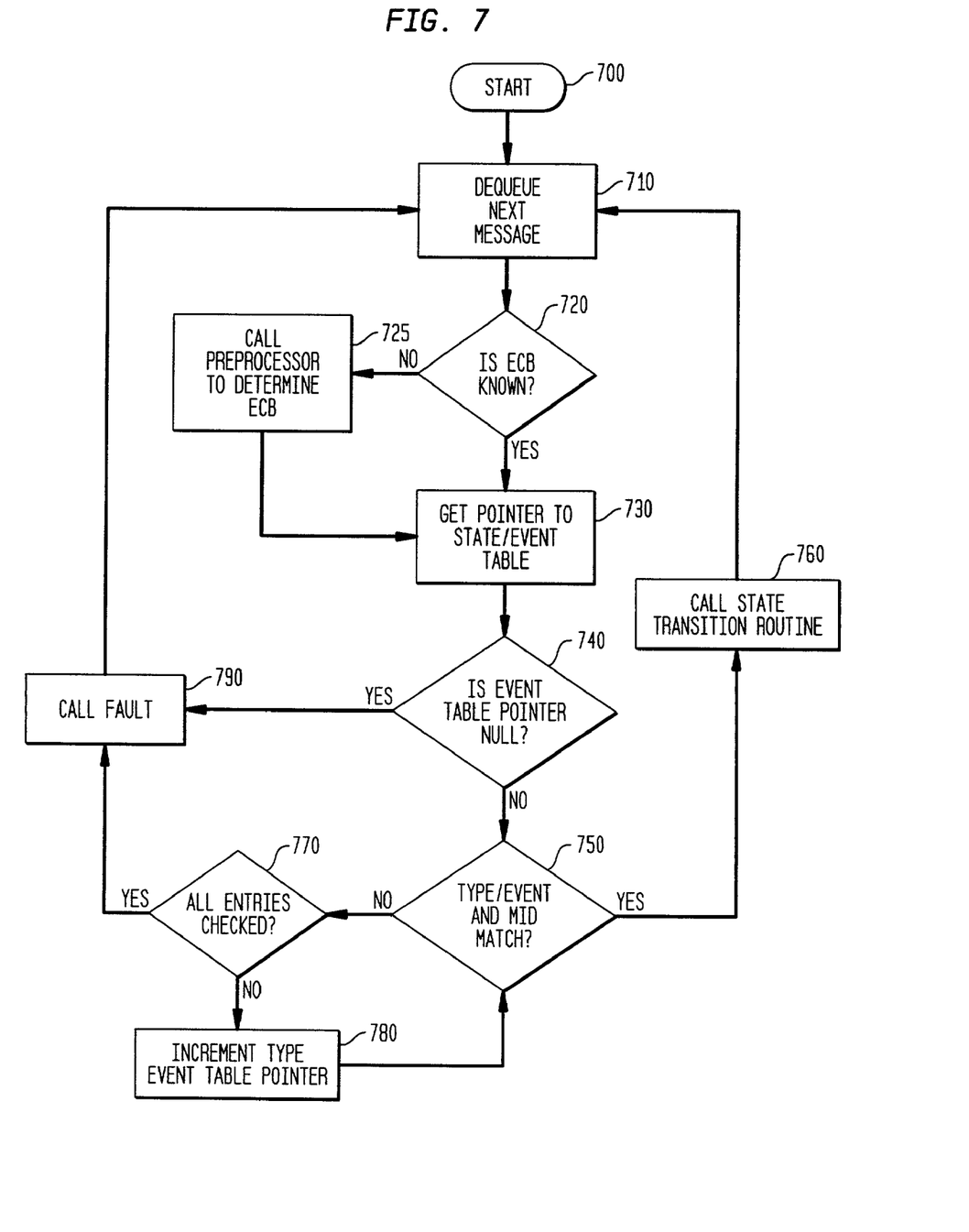
FIG. 7 is a flow diagram of using the data structures of FIGS. 4, 5, and 6.

Referring now to FIG. 7 and previous drawings, the flow diagram presents the steps to use this present invention and begins at step 700. The flow assumes an inter-task TSF message is present to dequeue from the RTOS message queue for a given task; otherwise this flow is not executed. At step 710 a pending TSF message is dequeued by the RTOS, a VxGex function checks whether a valid destination ECB 425, is present in the TSF message. If not present or NULL, a preprocessor function is called at step 725 which analysis the TSF to determine which ECB is appropriate given the detailed contents of the TSF and field 435 is updated in the TSF. Usually the ECB is provided in the TSF by the originating Gex task and this step is often not necessary.

The next step in either case is step 730 where a pointer is retrieved from the State Pointer table of the current task. The current state 515 is used to index this table. If the event table pointer is NULL, as checked in step 740, this is a fault condition and an appropriate fault handler shown at step 790 is called to log this instance. The current message is then ignored and the next message processed at step 710. Debug information may also be recorded of the state and event information for later retrieval at step 790.

TABLE A

OCCUPANCY_TSK
;
;
UNEQ_S
/* Type                                   Event                         Message ID    Transition Routine
;
OCCUPANCY_TYPE, INIT_IE,                                                ANY_MID       coccupancy_uneq_init_tr
OCCUPANCY_TYPE, MINUTE_IE,                                              ANY_MID       coccupancy_uneq_min_tr
OCCUPANCY_TYPE, QUARTER_HOUR_IE,                                        ANY_MID       ignore_event
OCCUPANCY_TYPE, HOUR_IE,                                                ANY_MID       ignore_event
OCCUPANCY_TYPE, DBG_OCC_E,                                              DBG_RQ_M      coccupancy_act_poll_tr
;
ACTIVE_S
OCCUPANCY_TYPE, MINUTE_IE,                                              ANY_MID       coccupancy_act_minute_tr
OCCUPANCY_TYPE, QUARTER_HOUR_IE                                         ANY_MID       coccupancy_act_qhour_tr
OCCUPANCY_TYPE, HOUR_IE                                                 ANY_MID       coccupancy_act_hour_tr
OCCUPANCY_TYPE, DBG_OCC_E,                                              DBG_RQ_M      coccupancy_act_poll_tr
OCCUPANCY_TYPE, INIT_IE                                                 ANY_MID       coccupancy_uneq_init_tr Referring to FIG. 6, the exemplary pseudo-code of TABLE A is represented pictorially. In addition to the UNEQ_S and ACTIVE_S states, 602 and 606 respectively, three additional states are shown, IDLE_S, MOS_S, and FOS_S, 603, 604 and 605 resepctively. A State Pointer table (also known as a state/event table) for this given task 600, provides pointers to one or more Type Event Tables 620. Multiple State Pointer Tables may exist in a system. Typically, there is one for each subsystem in the system.

Figure 6:
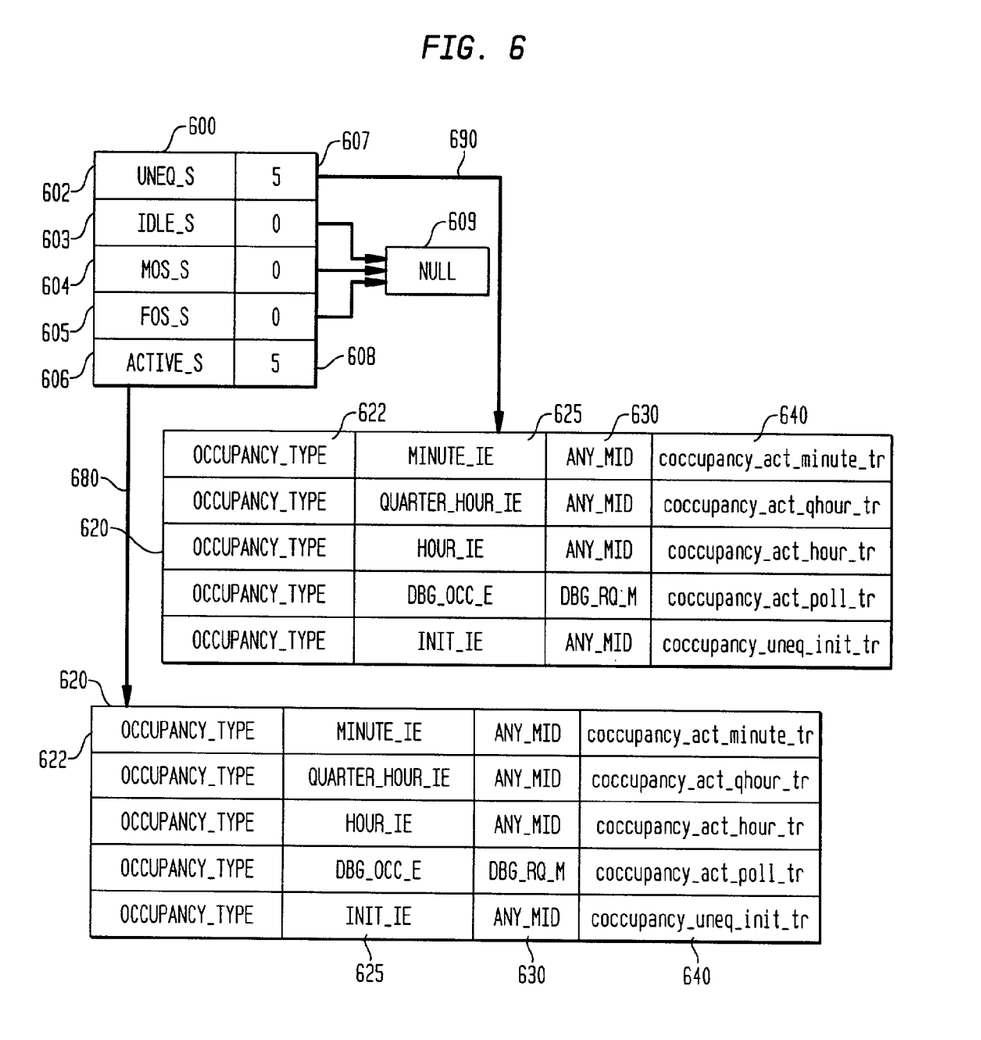
FIG. 6 is a memory layout and relationship diagram of the present invention's state machine data structures.

The pointer for the UNEQ_S state 602, shown as 690, is accompanied by a count field, 607. The amount of events defined for this state is five. The pointer for the ACTIVE_S state 606, shown as 680, also has count field 608, which defines five events. The Type Event Table 620, has four fields. The first field is a Type field 622, labeled as OCCUPANCY_TYPE, which is the ECB type. The second field is the Event field 625, and defines the events permissible in this state. The third field is the Message ID field 630, which indicate the task valid for this event in this state. When an event is processed, this field is double-checked and matched against the task involved. The fourth field 640 is the address of the event handler routine. Any state with no permitted events are designated such with a NULL pointer 609, in the State Pointer table 600.

If the event table pointer is not NULL at step 740, then a search is made, at step 750, of a Type Event Table 620 pointed to by the appropriate entry of the State Pointer table 600. The count field, such as 607 or 608, is used to control the search limits. A search is made of three elements for a match that includes the Type field 622, the Message ID field 630, and the Event field 625. These are matched to the Type field 525, the Identity field 530, and Event field 516, respectively. If a match is found, the corresponding state transition routine is called using pointer field 640, as shown in step 760. Once the transition routine completes, process control continues at step 710.

If the comparison of step 750 does not provide a match, then a test at step 770 is made to see if all entries within the Type Event Table has been checked. If another entry is available, the pointer to the Type Event is incremented at step 780. The next entry is then checked for a match at step 750.

If all entries of the Type Event table have been checked at step 770, the result is considered a fault since no pre-established entry to process the event for the Message ID and Type exists. Fault processing is called at step 790. Which processes the fault and continues with step 710.

The process continues as long as a message is available in the message queue. The RTOS provides to this access to the processor as needed by pre-established time-slicing arrangements.

While the invention has been described in terms of preferred embodiments, those skilled in the art will recognize that the invention can be practiced with modifications and in the spirit and scope of the appended claims.

Having thus described our invention, what we claim as new and desire by Letters Patent is as follows:

1. A general purpose computer-based system for implementing a state machine in a computer memory; said state machine implementing a process control system for managing processing of inter-task messages between tasks under control of a real-time operating system, the inter-task messages created as a result of hardware events and software events, the state machine comprising:
   a first data structure containing one or more first entries, each said one or more first entries including:
      a pointer to a second data structure, and
      a countfield, said one or more first entries each representative of a state, and said count field representative of a count of events valid for said state; and
   a said second data structure containing one or more second entries, each said one or more second entries including a Type field, an Event field, a Message ID field, and a state transition routine pointer for providing the address of the state transition routine.

2. The state machine as recited in claim 1, wherein said first data structure comprises a plurality of said first data structures.

3. The state machine as recited in claim 1, wherein said second data structure comprises a plurality of said second data structures.

4. The state machine as recited in claim 1, wherein said Type field represents a task identification.

5. The state machine as recited in claim 1, wherein said Event field represents one of either a hardware event or a software event.

6. The state machine as recited in claim 1, wherein said count field comprises a NULL field.

7. The state machine as recited in claim 1, further comprising a third data structure, said third data structure being an Event Control Block comprising:
   a second Message ID field; and
   a second event field, said second event field used to match a said first event field and said second Message ID field used to match a said first Message ID field.

8. A state machine method for use in a process control system for managing processing of inter-task messages between tasks under control of a real-time operating system (RTOS), the inter-task messages created as a result of hardware events and software events, the method comprising the steps of:
   dequeuing an inter-task message;
   checking said inter-task message for a known Event Control Block entry;
   getting a pointer to a State Pointer table;
   checking State Pointer table entry for a NULL pointer;
   accessing a Type Event table using a second pointer;
   comparing a Type Event table Message ID field to an Identity field of said inter-task message;
   comparing an Type Event table Event field to a second Event field of said inter-task message; and
   comparing a Type Event table Type field to a second Type field of an inter-task message.

9. The state machine method as recited in claim 8, further including the step of calling a call state transition routine.

10. The state machine method as recited in claim 8, wherein when any one comparison step is false the method includes incrementing said second pointer.

11. The state machine method as recited in claim 10, wherein the incrementing
   said second pointer step further includes:
      checking whether all entries in said Type Event table have been checked; and
      calling a fault routine in the case where all entries have been checked.

12. The state machine method as recited in claim 8, wherein said second pointer is obtained from said State Pointer Table.

13. The state machine method as recited in claim 8, wherein when the checking State Pointer table entry for a NULL pointer step is true the method includes calling a fault routine.

* * * * *